United States Patent Office 2,957,115
Patented Oct. 18, 1960

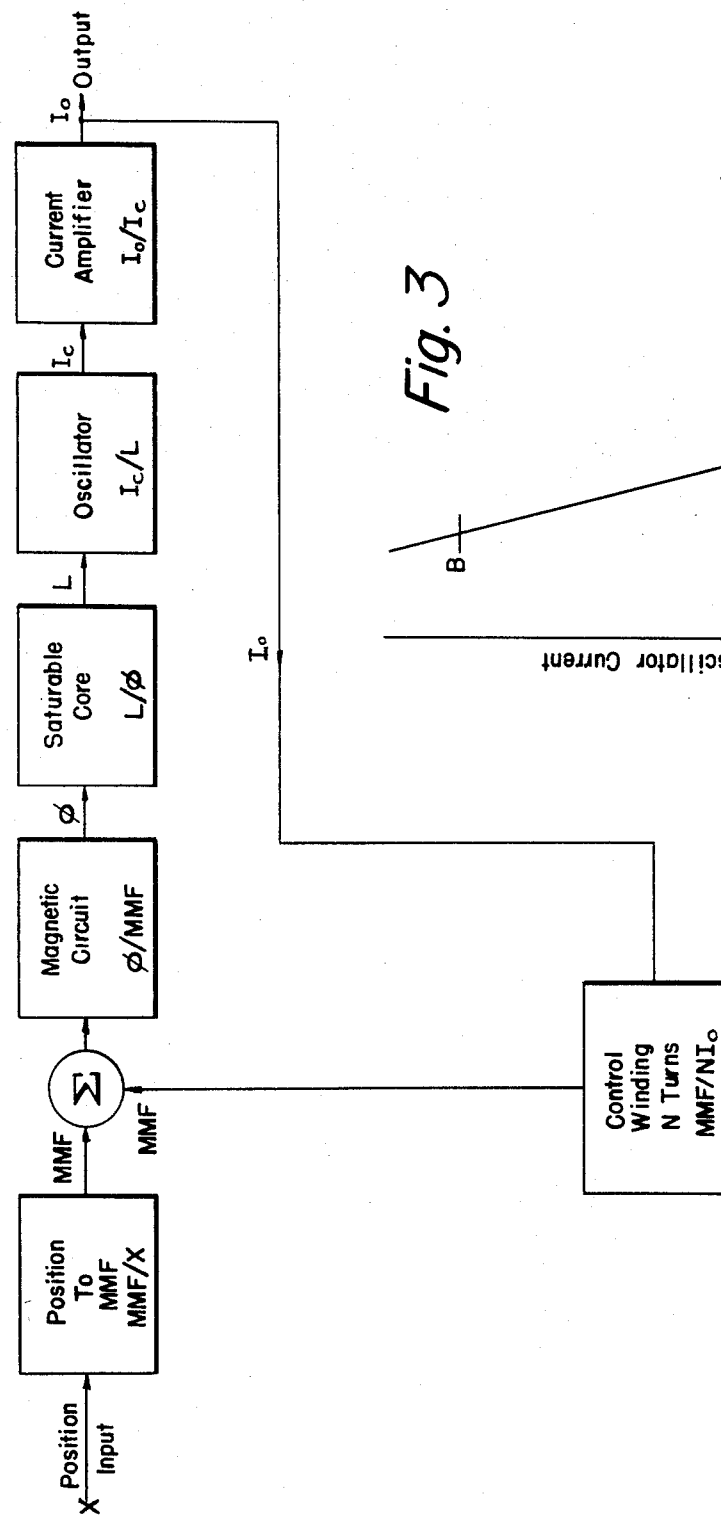
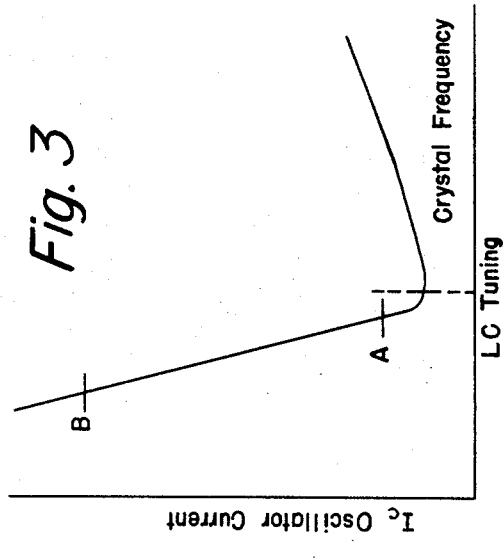

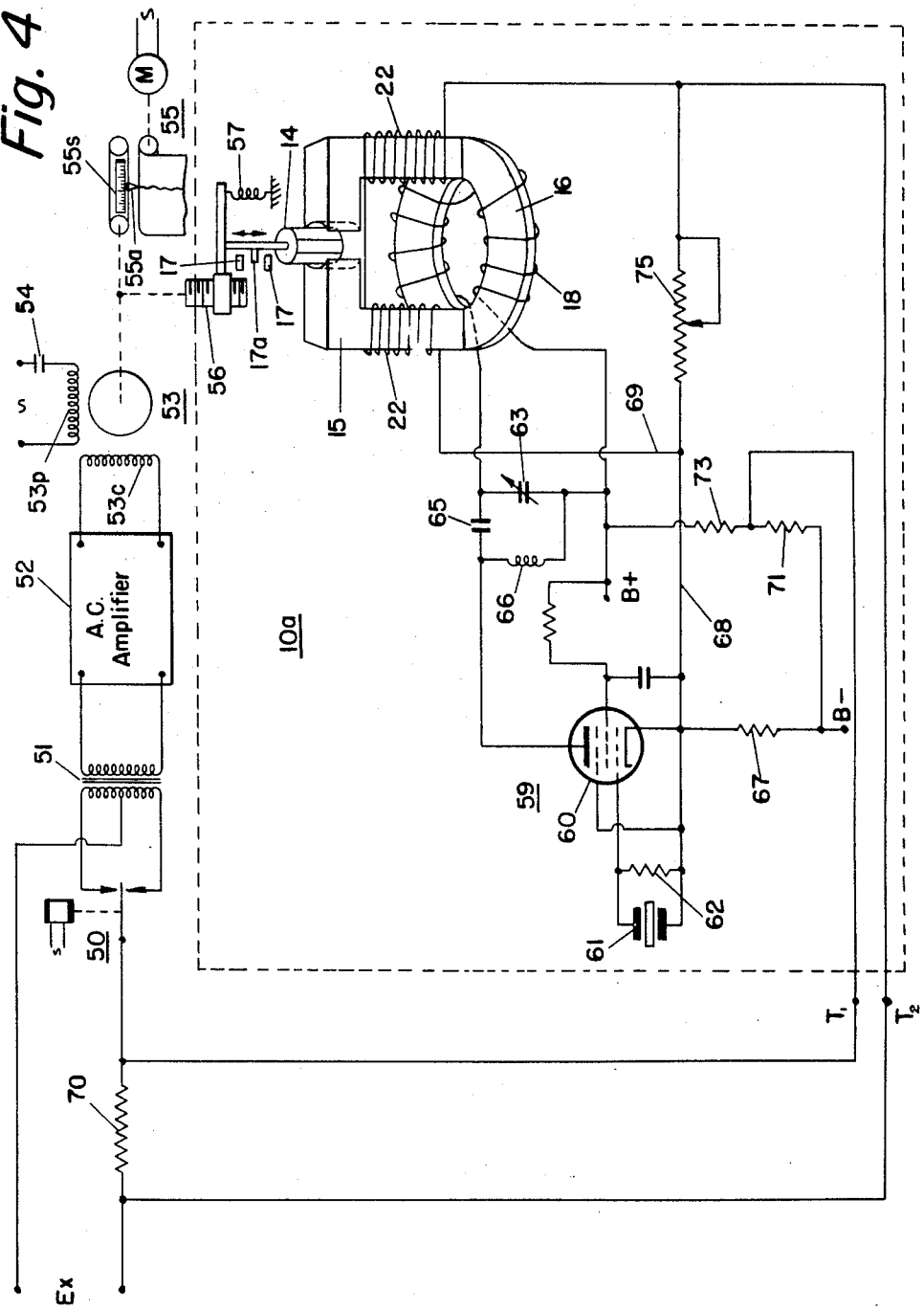

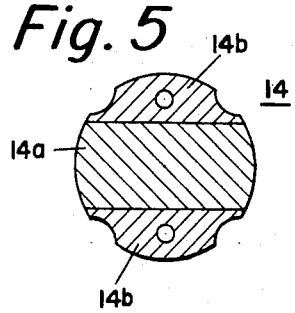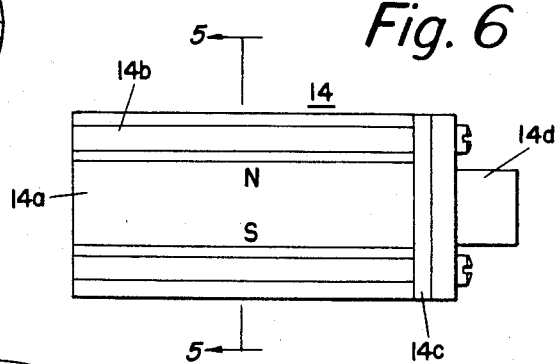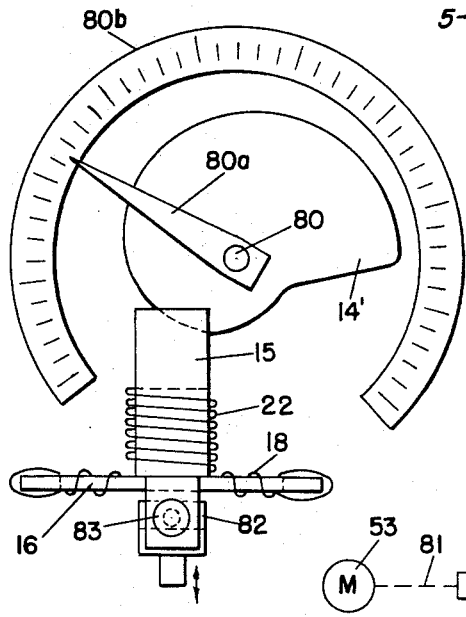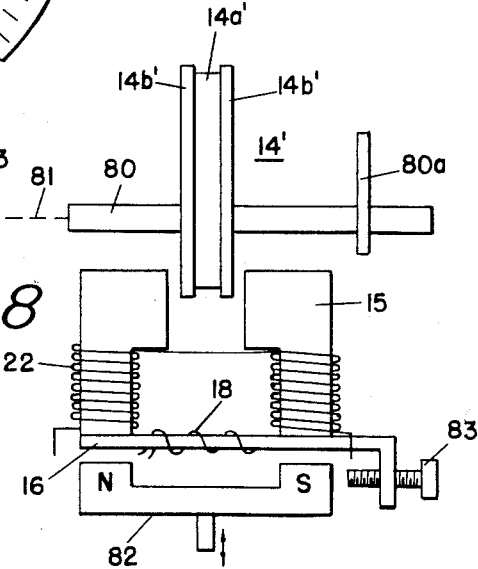

2,957,115

ELECTRICAL MEASURING AND CONTROL SERVOSYSTEM

William Russell Clark, Jenkintown, Will McAdam, Blue Bell, and George Richard Moreland, Drexel Hill, Pa., assignors to Leeds and Northrup Company, Philadelphia, Pa., a corporation of Pennsylvania Filed Nov. 28, 1958, Ser. No. 776,798

19 Claims. (Cl. 318—28)

This invention relates to electrical systems including a transducer for converting a mechanical input to an electrical output and has for an object the provision of an electrical control system including a variable inductor in which the inductance is controlled by a D.C. flux generated either by a direct current or a permanent magnet to provide a stabilized direct current output which may be used in the measurement of displacement, inductance, capacitance, or an unknown direct current or E.M.F. or may be used as a source of constant current.

In accordance with the invention there is provided a system for converting a mechanical input signal to an electrical output signal bearing a predetermined relation to the input signal. The system includes an oscillator having a capacitance and inductance means, including a saturable core, connected to form a tuned circuit. The oscillator is powered from a direct current source and there is provided means movable relative to the inductance means for varying its inductance in response to changes in the input signal to vary the operation of the oscillator and the direct current drawn by the oscillator from the D.C. source. Circuit connections are provided for applying to the inductance means a direct current signal responsive to and varying with the direct current from the source to the oscillator for varying independently of the signal input means the flux level of the core in accordance with the direct current to maintain the inductance of the inductance means at its original value. The system also includes means for producing from the direct current an electrical signal output varying with the input signal.

In one form of the invention there is provided in a control system a combination having a magnetic core in the form of a ring and magnetizing means for establishing a predetermined unidirectional magnetic flux in the core. The core is encircled by a winding, the inductance of which has a magnitude depending upon the magnitude of the flux in the core. The level of flux within the core is adapted to be varied by condition responsive means and there is also provided direct current means producing a magnetomotive force acting upon the level of flux in the core. The system also includes means responsive to change in the inductance of the winding for varying the energization of the direct current means in a direction and extent to maintain the inductance at a selected value. In the preferred form, the responsive means includes an oscillator of the fixed-frequency type which includes a crystal for determining the frequency of oscillation and a resonant circuit which is tuned to a selected frequency at one side of the crystal resonance for maintaining oscillation of the oscillator at a selected amplitude. The winding, which encircles the core, forms at least a part of the inductance of the tuned circuit whereby change of the inductance will change the efficiency of operation of the oscillator and therefore the magnitude of the direct current supplied to the oscillator. The direct current supplied to the oscillator is used to control the energization of the D.C. flux varying means.

For a more detailed disclosure of the invention and for further objects and advantages thereof, reference is to be had to the following description taken in conjunction with the accompanying drawings in which:

Figs. 2 and 3 are diagrams useful in explaining the invention;

Fig. 4 is a schematic diagram of a modification of the transducer shown in Fig. 1 as applied to a recording system;

Fig. 5 is a cross sectional view of the plunger-type movable magnetic member shown in Figs. 1, 4 and 6;

Fig. 6 is an elevational view of the magnetic member shown in Fig. 5;

Fig. 7 is a front elevation of an embodiment of the invention including a rotary-type movable magnetic member; and Fig. 8 is a side elevation of the embodiment shown in Fig. 7.

Figure 1:
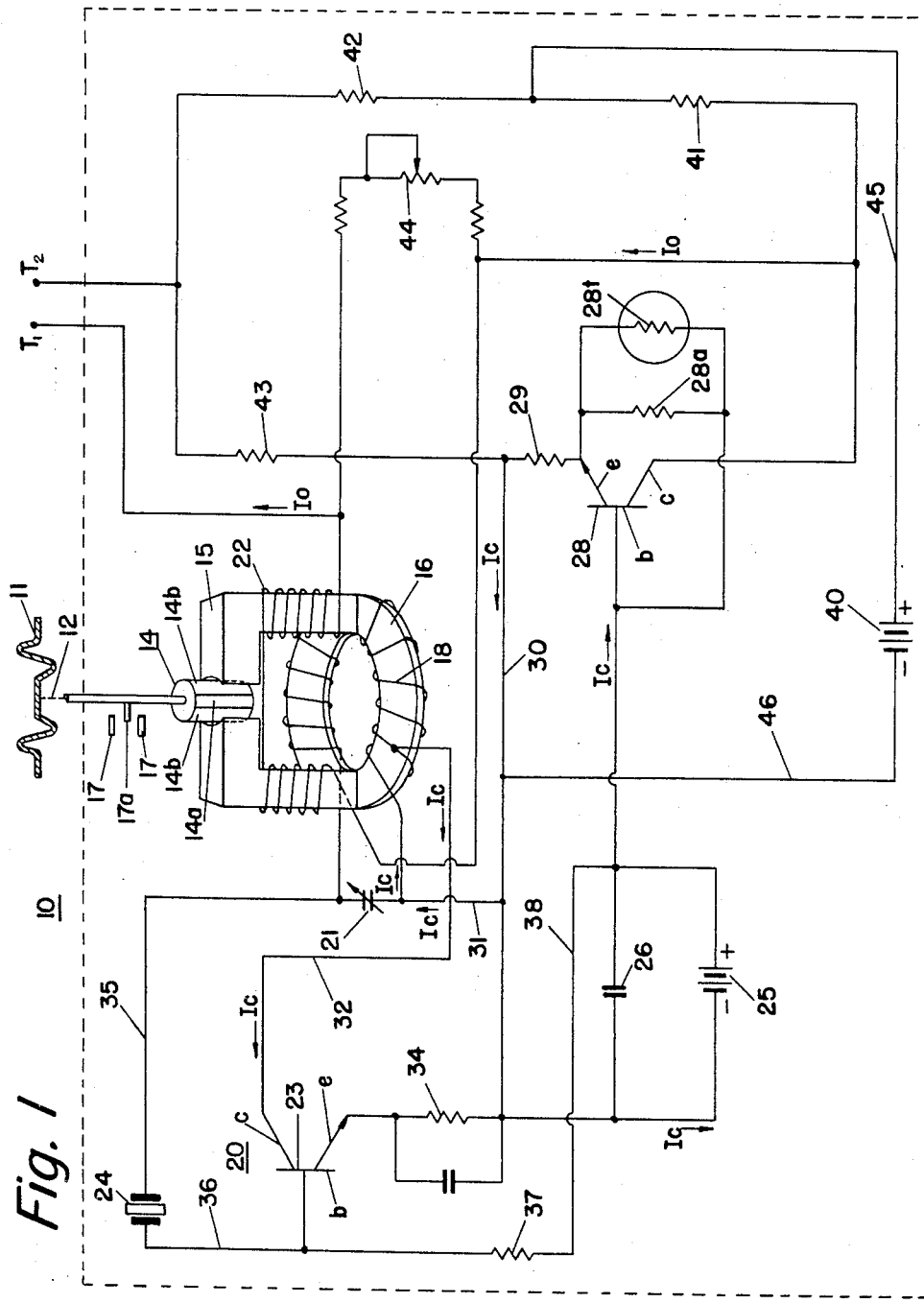
Fig. 1 is a schematic diagram of a transducer embodying one form of the invention.

Referring to Fig. 1, the transducer 10 has been illustrated as being contained within a broken line rectangle. The mechanical input or displacement motion may be derived from any suitable type of sensing element, such as a Bourdon tube, bi-metallic element, bellows, diaphragm or other displacement means and has been illustrated schematically as a diaphragm 11 which is connected by way of a suitable mechanical connection 12 to a magnetic member or plunger 14 which is adapted for longitudinal movement within the slot of a stationary magnetic core 15. The magnetic plunger 14 includes a permanent magnet 14a disposed at the center thereof and having soft iron pole pieces 14b disposed on opposite sides thereof as shown in Figs. 5 and 6. The amount of magnetic flux from plunger 14 passing through core 15 varies with the position of plunger 14 within the slot of core 15. The change in flux is linear with the change in position of the plunger 14 in core 15 and mechanical stops 17 are provided to cooperate with projection 17a for preventing the plunger 14 from moving beyond the range in which the linear relationship exists. The flux passing through the core 15 extends through a path including an endless ferrite ring 16 which is adjacent to the core 15. The ring 16, as shown, is thin and flat in cross section. It is made flat for close association with the ends of the legs of core 15. The ring 16 has wound thereon a winding 18 which forms the inductance of a tuned circuit for an oscillator 20. A capacitor 21 forms the other element of the tuned circuit and is connected in parallel with the inductive winding 18 which is transversed by the A.C. oscillatory current. Winding 22 is wound on the legs of the magnetic core 15.

The oscillator 20 includes a transistor 23 and is of the fixed-frequency type. For example, it includes a crystal 24 which determines the frequency of oscillation. A crystal oscillator is employed in order to provide a high Q circuit. The resonant circuit including the capacitor 21 and the inductive winding 18 for the oscillator 20 is tuned to a frequency slightly higher than the frequency of crystal 24 by capacitor 21 with the plunger 14 in a predetermined position. Upon change in position of plunger 14 by movement of displacement means 11 there will be a change in flux in core 15 which will change the flux threading the endless member 16. The change in flux in the endless member or ring 16 will change the inductance of the alternating current winding 18 thereon. This will cause the oscillator 20 to operate at a different efficiency and the collector current $I_c$ will change.

As may be seen in Fig. 1, the voltage source for the oscillator 20 has been illustrated as a battery 25 across which there is connected an RF by-pass capacitor 26. The direct current supply for oscillator 20 is by way of the base and emitter of an amplifier transistor 28. The direct current circuit for the collector current $I_c$ extends from one side of battery 25, through transistor 28 and a resistor 29, conductors 30 and 31, through a few turns of the winding 18, through conductor 32, into the collector of transistor 23, out through the emitter and through the resistance 34 to the opposite side of battery 25. Since the direct current is passed through only a few turns of winding 18 and is low, it does not significantly change the flux in ring 16. The resistors 29 and 34 associated with the respective transistors 28 and 23 are degeneration resistors for stabilizing the direct current operating points of the transistors. The crystal 24 is connected by way of conductor 35 to a junction between one end of winding 18 and capacitor 21 of the tuned circuit and by way of a conductor 36 to the base of transistor 23. The base of transistor 23 is connected by way of a biasing resistor 37 and conductor 38 to the positive side of the battery 25.

The voltage source for the amplifier transistor 28 has been illustrated as a battery 40 and is connected across a network which includes resistors 41, 42 and 43 and the transistor 28. It will be noted that the resistors 41–43 and the transistor 28 are arranged in the form of a bridge network with the battery 40 being connected by way of conductor 45 between resistors 41 and 42 and by way of conductors 46 and 30 between the transistor 28 and the resistor 43. The transistor 28 and the resistor 42 are in opposite legs of the bridge as are resistors 41 and 43. The D.C. control winding 22 on core 15 is connected across conjugate points of the bridge in series with the load which is adapted to be connected to the external terminals $T_1$, $T_2$, which project beyond the block 10. Change in current through the winding 22 as a result of change in position of plunger 14 is always in a negative feedback direction to return the magnetic flux in ring 16 to its original value thus to restore the original inductance value for the winding 18.

The operation of the foregoing system may be readily seen by reference to the explanatory diagram shown in Fig. 2. As may be seen in Fig. 2, the first block of the diagram represents an effective magnetomotive force (M.M.F.) introduced into the magnetic core 15 the magnitude of which is established by the position X of the magnet or plunger 14 within core 15. It will be assumed that there is a change in position of member 14 which creates a corresponding change in M.M.F. This in turn creates a change in flux $\phi$ which in turn creates a change in inductance L which in turn changes the oscillator current $I_c$ and produces a change in the output current $I_o$. The change in output current is effective on the ampere turns (NI) of the D.C. control winding 22 to inject a change in M.M.F. of equal magnitude and opposite sign to oppose the original change in M.M.F. and thereby restore the balance between the two M.M.F.'s and provide changed output current. Because of the balance between the two M.M.F.'s, a linear change of M.M.F. with position of the plunger 14 will result in a linear relation between the position of the plunger and the output current $I_o$.

As pointed out above, the resonant circuit for the transistor oscillator 20 is tuned to the high frequency side of crystal frequency. This is illustrated in the diagram shown in Fig. 3 where collector current $I_c$ has been plotted against tuning LC. It will be understood that the low point of the curve is the point of crystal frequency. The circuit is adapted to operate between limits A and B on the high-frequency side of crystal frequency. As long as operation takes place within these limits, any change in collector current will provide a stabilizing negative system feedback on the ring 16. If operation of this circuit takes place to the right or low frequency side of crystal frequency, a change in collector current will produce a positive system feedback which will cause the oscillator to go out of oscillation.

The amplifier 28 is used to provide sufficient output at terminals $T_1$, $T_2$. Where the output from the oscillator 20 is of sufficient amplitude, the amplifier may be eliminated in manner similar to the circuit shown in Fig. 4, hereinafter to be described. It will be noted a resistor 28a is connected between the base and emitter of the amplifier transistor 28. The resistor 28a provides the desired value of gain for the transistor amplifier 28 and its resistance is determined by the D.C. gain of the transistor. The oscillator 20 has an optimum D.C. current for operation to produce optimum sensitivity and dynamic range. The gain of the amplifier 28 affects the reference or initial D.C. oscillator current and therefore resistor 28a is used to determine the amplifier gain to provide the proper operation of oscillator 20.

To provide stabilized operation of the circuit in Fig. 1 with respect to ambient temperature changes, a thermistor 28t is connected in parallel with the resistor 28a between the base and emitter of the transistor 28. Temperature stability in the oscillator circuit is provided by connecting the collector of transistor 23 to a tap point a few turns from the end of winding 18 to minimize the effect of the change in capacitance of the transistor 23 with change in temperature.

To provide range adjustment for the circuit in Fig. 1, an adjustable resistance circuit 44 is connected in shunt with the D.C. control winding 22 to change the relationship between the rebalancing current through winding 22 and the output current $I_o$.

Referring to Fig. 4, the invention has been shown as applied to a recording system. An unknown D.C. signal $E_x$ to be recorded is applied to a vibrator 50 of any suitable type for converting direct current to alternating current. The resulting alternating current is applied by way of a transformer 51 to an A.C. amplifier 52. The output of the amplifier 52 is utilized to energize a control winding 53c of a motor 53. The motor 53 is provided with a power winding 53p which is energized from an A.C. source connected by way of a phasing capacitor 54. The motor 53 is adapted to position a pen index 55a of a recorder 55 relative to a scale 55s, and at the same time, by way of a threaded drive 56, longitudinally moves the magnetic member 14 against the bias of a spring 57 and relative to the stationary magnetic core 15. The spring 57 is provided to eliminate the effects of back lash or lost motion in the mechanical drive from motor 53 to plunger 14.

The transducer 10a in Fig. 4 is generally similar to the transducer 10 shown in the broken line rectangle in Fig. 1 and they are interchangeable. The principal difference between the transducers 10 and 10a is that the latter includes an oscillator tube 60 instead of transistors. The oscillator 59 is of the fixed-frequency type having a crystal 61 connected across the cathode and grid of tube 60 in parallel with a biasing resistor 62. The tuned circuit for the oscillator 59 includes the winding 18 on ring 16 and a variable capacitor 63. The resonant circuit for the oscillator 59 is tuned to the low frequency side of crystal frequency by capacitor 63 with the plunger 14 in a predetermined position. It will be noted that this adjustment is just the opposite of that for the system of transducer 10 with the transistors 23 and 28 previously described. The reason for the opposite adjustment is because the curve shown in Fig. 3 for the transistor oscillator is just the opposite from the curve for the vacuum tube oscillator. In the transistor oscillator 20, Fig. 1, the crystal 24 is used as a series element in the feedback filter circuit whereas in the vacuum tube oscillator 59, Fig. 4, the crystal 61 is a shunt element of the feedback filter circuit.

Upon change in position of magnetic member 14 by rotation of motor 53, there will be a change in flux in core 15 which will change the flux threading the endless member or ring 16. The change in flux in ring 16 changes the inductance of the winding 18, and the oscillator 59, including tube 60, will operate at a different efficiency and thereby cause the tube plate current to change. A capacitor 65 and an RF choke 66 form a shunt feed network for the oscillator 59 to prevent any change in direct current of the plate circuit from altering the flux in ring 16 as a result of flow through winding 18.

The direct current supplied to the oscillator 59 flows from B+ through choke 66 through the tube 60 of the oscillator 59 and through a cathode resistor 67 to B—. Current also flows from the cathode of the tube 60 by way of conductors 68 and 69 to the winding 22 on core 15 and by way of load resistor 70 and resistor 71 to B—. As mentioned in connection with Fig. 1, the change in D.C. current through the winding 22 is always in a direction to return the magnetic flux in ring 16 to its original value so as to restore the original inductance value for the winding 18. An additional resistor 73 extends from the upper end of resistor 71 to B+. Thus it will be seen that for transducer 10a there is provided a bridge network in which the tube 60 and resistor 71 are in opposite legs and the resistors 67 and 73 are in opposite legs. The winding 22 is connected across the conjugate points of this bridge in series with output terminals $T_1$, $T_2$. A rheostat 75 is connected in shunt with the winding 22 for range adjustment. Thus it will be seen that the transducer 10a is adapted to convert a mechanical position produced by motor 53 to a stable D.C. current between terminals $T_1$, $T_2$. In the recorder of Fig. 4 resistor 70 connected across terminals $T_1$, $T_2$ produces the rebalancing voltage in the input circuit including the vibrator 50. Thus the change in current through winding 22 is in a direction to change the potential drop across resistor 70 in a direction to restore balance between that potential difference and the unknown voltage $E_x$.

The foregoing recording system using transducers 10 or 10a to provide the rebalancing signal has several advantages over the conventional slidewire type systems, such as: elimination of uncertain electrical contact between the slidewire and its slider due to wear, slider bounce and change in contact resistance; this recording system requires no periodic standardization and avoids mechanical loads on the rebalancing motor.

With the above understanding of the invention it will be understood that the basic elements thereof may be used for control purposes. A sensing element such as a Bourdon tube, bimetallic element, bellows, diaphragm or other displacement means may be applied to move the magnetic plunger 14 relative to the slot in core 15. In response to the changed magnitude of the direct current supplied to the oscillator 59, relays or other sensing devices may be operated to change the condition under control for restoration of magnetic member 14 to its original position.

The foregoing control will be of the proportional type and will have droop. In general, it will be desired to provide control systems having the usual reset and rate actions, such for example as disclosed in Davis Patent 2,830,244. Accordingly, the change in current due to change in efficiency of the oscillator will be utilized through the controller to actuate the final control elements.

Referring to Fig. 5, there is shown a cross sectional view of the magnetic plunger 14. It illustrates the permanent magnet 14a as the central element with the two soft iron pole pieces 14b on opposite sides thereof. The permanent magnet element 14a may consist of permanent magnet material available commercially under the trade names Indox or Alnico. The soft iron pole pieces 14b insure a uniform distribution of magnetic flux along the length of the plunger 14 to provide linearity between the change in flux in core 15 and displacement of plunger 14. Further to insure linearity the stops 17, Fig. 4, are so positioned relative to the core 15 that the fringing field at the distal and proximal ends of the plunger 14 always operate in a uniform magnetic environment. Specifically, the stops 17 insure motion of the distal end of plunger 14 within the slot in core 15 and prevent this end of the plunger 14 from approaching the ends of the slot by a distance less than the length of the air gap therebetween. It is desirable that the plunger have a magnetic permeability approaching that of air to maintain a substantially constant reluctance of the magnetic path for flux from winding 22 to provide a linear response to the D.C. current in the control winding 22. The plunger 14 is shown in elevation in Fig. 6 and at one end of the member there is provided a wafer or disc 14c of a material which provides temperature compensation against change in flux with change in ambient temperature. One suitable material from which to form the disc 14c is Carpenter Steel Temperature Compensator Alloy 30, Type 2. The plunger 14 is also provided with a mechanical connector 14d which is adapted to be connected to the sensing element or other mechanical input device such as the diaphragm 11 in Fig. 1 or to the motor 53 in Fig. 4.

In Figs. 7 and 8 the magnetic member 14 has been shown as of the rotary type rather than the plunger type shown in Figs. 1 and 4. The rotor 14' includes a center magnet element 14a' to the faces of which are connected soft iron pole pieces 14b', Fig. 8. The rotor 14' is adapted to be mounted on a shaft 80 and driven through a suitable connection illustrated by broken line 81 from motor 53. It will be noted that a part of the rotor 14' is movable through the air gap or slot in the core 15. The shape of the rotor 14' is such that it produces a linear change of flux in the core 15 with change in angular position due to rotation of shaft 80. This linear change of flux in core 15 is achieved by shaping the pole pieces 14b' of the rotor so that the change in the area of overlap between the pole pieces 14b' and the core 15 varies linearly with angular rotation of shaft 80. The shaft 80 is provided with a pointer 80a which is adapted to cooperate with a scale 80b which may be calibrated in suitable units. The scale may be linear since the change of flux in the core 15 is linear with change in angular position. The arrangement of Figs. 7 and 8 is particularly desirable since the pointer 80a is carried by the same shaft as rotor 14'. The rotor 14' is adapted for rotation through a substantial angle, for example, approximately 300°, and this permits the use of a scale 80b of similar large angularity for cooperation with the pointer 80a without the need of any undesirable intermediate gearing.

There is associated with the ring 16 a permanent magnet 82 which has for its purpose the production of a predetermined flux level in the ferrite ring 16 with the rotor 14' in its zero position. This flux level is the level at which the ferrite ring has a substantially zero temperature coefficient. The zero adjustment may be obtained by moving the magnet 82 relative to the ring 16 or by an additional magnet or iron member, such as a screw 83 which is adapted to be moved relative to magnet 82.

Such a zero adjusting bias magnet may also be used with the plunger 14 in the embodiments shown in Figs. 1 and 4. While a permanent magnet has been shown to provide the zero adjustment, an adjustable magnetic member such as the screw 83, may be used to provide a magnetic shunt with respect to the air gap or slot in core 15. The zero adjustment may also be obtained by an electrically produced magnetomotive force such as by injecting a zero adjusting current into winding 22 or a separate winding on the core 15.

While the shape of the rotor 14' has been described as being such that it produces a linear change in flux in core 15 with angular position, it is to be understood that by suitably shaping the rotor 14', any desired non-linear change may be obtained.

It shall be understood that the invention is not limited to the specific arrangements shown and that changes and modifications may be made within the scope of the appended claims.

What is claimed is:

1. In a control system, the combination of a magnetic core, magnetizing means for establishing a predetermined magnetic flux level in said core, a winding encircling said core, the inductance of which has a magnitude depending upon the magnitude of said flux in said core, condition-responsive means for varying said level of flux within said core, direct current means acting upon said level of flux in opposition to said condition-varying means, and means responsive to change in the inductance of said winding for varying the energization of said direct current means in direction and extent to maintain said inductance at a selected value, said responsive means including a crystal controlled oscillator having a tuned circuit resonant at a frequency to one side of the crystal frequency for maintaining oscillation of said oscillator, said winding forming at least a part of the inductance of said tuned circuit whereby change of said inductance will change the efficiency of operation of said oscillator and therefore the magnitude of the direct current supplied to said oscillator, said direct current supplied to said oscillator being used to control the energization of said D.C. flux varying means.

2. In a system according to claim 1 in which said condition-responsive means comprises pole pieces associated with said magnetic core and a permanent magnet movable relative to said pole pieces to vary the magnetic flux passing between the said pole pieces to change the magnetization of said core, said pole pieces and said permanent magnet having substantial overlap of opposing surfaces during relative movement between them.

3. In a system according to claim 1 in which said magnetic core is an endless member.

4. In a system according to claim 3 in which flux-carrying members are disposed against the surface of said endless member at diametrically opposite locations thereof, and an alternating current winding having at least one coil is disposed about said endless member.

5. In a system according to claim 3 in which said endless member is thin and flat.

6. In a control system, the combination of a thin, flat endless core, magnetizing means for producing a flux of magnitude which partially saturates said core, a winding disposed about said core the inductance of which varies with change of level of flux therein, condition-responsive means having a flux-varying element movable to vary the inductance of a circuit including said winding, and means including a fixed-frequency oscillator having a direct current supply circuit, and a tuned resonant circuit including said inductance for varying the flux level in said core independently of said flux-varying element to maintain constant the inductance included in said resonant circuit.

7. In a system for measuring the magnitude of a condition which comprises a fixed-frequency oscillator including a tuned circuit, means for supplying direct current to said fixed-frequency oscillator, said current having a minimum value when the tuned circuit of said oscillator is resonant at the fixed oscillator frequency and which current increases with departure of said resonant frequency of said tuned circuit from said fixed frequency, said tuned circuit including a winding through which there extends a thin flat endless magnetizable core having a predetermined level of magnetization, means for varying the magnetization of said core and the inductance of said winding in response to change in the magnitude of the condition, and means responsive to said D.C. supply current to maintain said magnetization of said core at said predetermined level.

8. A system for converting a mechanical input signal to an electrical signal bearing a predetermined relation to said input signal comprising inductance means, an oscillator, said oscillator including a capacitance and a portion of said inductance means connected to form a tuned circuit, a direct current source for supplying power to said oscillator, means movable relative to said inductance means for varying said inductance means in response to changes in said input signal to vary the operation of said oscillator and the direct current drawn by said oscillator from said source, circuit connections for applying to said inductance means a direct current signal responsive to and varying with the direct current from said source to said oscillator for varying independently of said movable means said inductance means in accordance with said direct current to maintain the inductance of said portion of said inductance means at its original value, and means for producing from said direct current an electrical signal output from said converting system varying with said input signal.

9. A system according to claim 8 wherein said means movable relative to said inductance means comprises a magnetic member.

10. A system according to claim 8 wherein said movable means comprises a permanent magnet member.

11. A system according to claim 8 wherein said oscillator is crystal-controlled and has a fixed frequency.

12. In a control system, the combination of a magnetic core, magnetizing means for establishing a predetermined magnetic flux level in said core, a winding encircling said core the inductance of which has a magnitude depending upon the magnitude of said flux in said core, condition-responsive means for varying said level of flux within said core, direct current means acting upon said level of flux in opposition to the variation of said flux level by said condition-varying means, and means responsive to change in the inductance of said winding for varying the energization of said direct current means in direction and extent to maintain said inductance at a selected value, said condition-responsive means including a magnetic member comprising a permanent magnet having pole pieces disposed on opposite faces thereof to provide a uniform distribution of magnetic flux along the length of said magnetic member, said magnetic member being associated with said magnetic core and adapted for movement lengthwise of a slot of said magnetic core whereby there is provided linearity between the input motion of said magnetic member and the output current over a substantial range of movement of said magnetic member.

13. A system according to claim 12 wherein said magnetic member has a magnetic permeability approaching that of air to maintain a substantially constant reluctance of the magnetic path to provide a linear response to the current in said direct current means.

14. A system according to claim 12 including stop means for limiting the maximum movement of said magnetic member relative to said magnetic core to prevent the distal end of said magnetic member from being completely withdrawn from the slot in said core and to insure a linear overlap between said core and said magnetic member at least as great as the length of the air gap therebetween.

15. A system according to claim 12 including means for adjusting the flux level in said core to a level at which said core has a substantially zero temperature coefficient.

16. A system for producing a stable direct current output signal comprising a magnetic core, magnetizing means for establishing a predetermined magnetic flux in said core, an oscillator winding encircling said core and continuously energized by current of oscillator frequency, the inductance of which winding has a magnitude depending upon the magnitude of said flux in said core, direct current means responsive to the direct current output signal and acting upon the level of flux in said core independently of said magnetizing means, and means responsive to change in the inductance of said winding for varying the energization of said direct current means in direction and extent to maintain said inductance at a selected value.

17. A system according to claim 16 including a permanent magnet movable relative to said magnetic core for varying the level of flux within said core to adjust the direct current output signal.

18. In a control system, the combination of a magnetic core, magnetizing means for establishing a predetermined magnetic flux level in said core, a winding encircling said core the inductance of which has a magnitude depending upon the magnitude of said flux in said core, condition-responsive means including means for varying said level of flux within said core, a direct current means acting upon said level of flux in opposition to the variation of said flux level by said condition-varying means, and means responsive to change in the inductance of said winding for varying the energization of said direct current means in direction and extent to maintain said inductance at a selected value.

19. A recording system including an input circuit for said recording system to which an unknown electrical signal and an electrical feedback signal are adapted to be applied, a rebalancing motor responsive to the difference between said electrical signals, said recording system including a transducer for converting the mechanical signal of said motor to said electrical feedback signal bearing a predetermined relation to said mechanical signal comprising inductance means, an oscillator, said oscillator including a capacitance and a portion of said inductance means connected to form a tuned circuit, a direct current source for supplying power to said oscillator, means movable relative to said inductance means for varying said inductance means in response to changes in said mechanical signal to vary the operation of said oscillator and the direct current drawn by said oscillator from said source, said last-named means being driven by said motor to provide said mechanical signal for said transducer in response to said difference between said electrical signals, circuit connections for applying to said inductance means a direct current signal responsive to and varying with the direct current from said source to said oscillator for varying independently of said movable means said inductance means in accordance with said direct current to maintain the inductance of said portion of said inductance means at its original value, and means for producing from said direct current said electrical feedback signal from said transducer varying with said mechanical signal.

References Cited in the file of this patent

UNITED STATES PATENTS

| | | |
|---|---|---|
| 2,380,242 | Jewell | July 10, 1945 |
| 2,576,611 | Lang et al. | Nov. 27, 1951 |
| 2,588,882 | Rolfson | Mar. 11, 1952 |
| 2,657,349 | Williams | Oct. 27, 1953 |
| 2,696,583 | Brown | Dec. 7, 1954 |
| 2,736,869 | Rex | Feb. 28, 1956 |